United States Patent
Mori

(10) Patent No.: US 7,809,137 B2
(45) Date of Patent: Oct. 5, 2010

(54) JOB ALLOCATION CONTROL APPARATUS AND JOB ALLOCATION CONTROL METHOD

(75) Inventor: Yasuo Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1003 days.

(21) Appl. No.: 11/343,421

(22) Filed: Jan. 31, 2006

(65) Prior Publication Data

US 2006/0181728 A1    Aug. 17, 2006

(30) Foreign Application Priority Data

Feb. 16, 2005    (JP) .............................. 2005-039720

(51) Int. Cl.
*G09C 3/00*    (2006.01)

(52) U.S. Cl. ................. 380/55; 380/51; 726/3; 726/4; 726/5; 726/6; 726/7

(58) Field of Classification Search ................... 726/27; 380/51, 55
See application file for complete search history.

(56) References Cited

U.S. PATENT DOCUMENTS

| | | | | |
|---|---|---|---|---|
| 5,077,795 A | * | 12/1991 | Rourke et al. ................ | 380/55 |
| 5,638,511 A | * | 6/1997 | Nezu .............................. | 726/5 |
| 5,752,697 A | * | 5/1998 | Mandel et al. ............... | 271/288 |
| 5,813,348 A | * | 9/1998 | Zingher ....................... | 101/494 |
| 6,052,684 A | * | 4/2000 | Du ................................. | 707/8 |
| 6,131,112 A | * | 10/2000 | Lewis et al. .................. | 709/207 |
| 6,578,005 B1 | * | 6/2003 | Lesaint et al. ................. | 705/8 |
| 6,611,348 B1 | * | 8/2003 | Chase et al. ................ | 358/1.15 |
| 7,265,854 B1 | * | 9/2007 | Hohensee et al. ........... | 358/1.15 |
| 2003/0182350 A1 | * | 9/2003 | Dewey ........................ | 709/100 |
| 2004/0136023 A1 | * | 7/2004 | Sato ............................. | 358/1.13 |
| 2005/0100378 A1 | * | 5/2005 | Kimura et al. ................ | 400/76 |

* cited by examiner

*Primary Examiner*—Minh Dieu Nguyen
*Assistant Examiner*—Amir Mehrmanesh
(74) *Attorney, Agent, or Firm*—Cowan, Liebowitz & Latman, P.C.

(57) ABSTRACT

In a job allocation control apparatus, whether or not a job has security setting is discriminated, if it is decided that the job has the security setting, this job is set to a scheduling target to a clean device, and if it is decided that the job does not have the security setting, this job is set to a scheduling target to a non-clean device. When a process of the job having the security setting as a scheduling target to the clean device cannot be executed, the job having the security setting is set to the scheduling target to the non-clean device. Whether or not the non-clean device satisfies a predetermined condition is discriminated. If the predetermined condition is satisfied, the job having the security setting is transmitted to the non-clean device.

8 Claims, 13 Drawing Sheets

JOB ALLOCATION CONTROL APPARATUS AND JOB ALLOCATION CONTROL METHOD

BACKGROUND OF THE INVENTION

1. Field of the Invention

The invention relates to job allocation control apparatus and method for controlling allocation of print jobs to a plurality of apparatuses.

2. Related Background Art

In what is called conventional commercial print industry in which a request to form printed matter such as magazine, newspaper, catalog, advertisement, photogravure, or the like is received from the third party such as customer or client, desired printed matter of the client is formed and delivered to the client, thereby obtaining a compensation from the client, it is a main stream even now that a large-scale printing apparatus or the like such as an offset photoengraving printer or the like is used.

In such print industry, the printed matter is subjected to processing steps such as sending a manuscript to a printer, design, layout, comprehensive layout (presentation by a printer output), proofreading (layout correction and color correction), proofreading printing (proof print), block copy forming, printing, post-processing modification, and dispatch until the printed matter is delivered. When the printer is used, the above block copy forming step is indispensable. Once a block copy is formed, it is not easy to correct it and the correction is fairly disadvantage in terms of costs. Therefore, careful proofreading, that is, the operation to check the layout and confirm the color is indispensable.

In such print industry as mentioned above, the large-scale apparatus is necessary and, in order to form the printed matter which the client desires, a certain time is also necessary. Moreover, a special knowledge is necessary in each of the operations in those steps and know-how of the experienced and skillful person called a specialist is necessary.

In recent years, in association with the realization of a high speed and high picture quality of a printing apparatus of an electrophotographic system and a printing apparatus of an ink jet system, a market called "Print On Demand" (hereinafter, abbreviated to a "POD") has also appeared in opposition to the print industry as mentioned above. That is, in the POD, in order to enable a large number of print copies or jobs to be handled in a short period of time without using a large-scale apparatus or system, by making the most of a digital image forming apparatus such as digital copying apparatus, digital multi-function apparatus, or the like in place of the large-scale printer or the printing method as mentioned above, a digital print using electronic data is realized, thereby doing business.

In the POD market, as compared with the conventional print industry, the digitization is united, management and control using a computer begin to spread, and a printing technique is approaching the level of the print industry to a certain extent by using the computer. In such a background, a PFP (Print For Pay) called a print service of a copy/print shop print company, a CRD (Centralized Reproduction Department) called an in-house print service in an enterprise, and the like exist in the POD market.

However, in the print industry and the POD market as mentioned above, although it is intended to provide such a service as to execute business that the printed matter is handled as goods and all of the operations such as ordering and reception of the goods, packaging, delivery, after-sales services, inventory control, and deposit management are executed as a proxy in a lump, a room for investigation still remains.

In the print industry and the POD market as mentioned above, a system in which a management plan and administration business are supported through collection, modification, and report of production-related data, information is accumulated, and it can be provided to necessary divisions in accordance with necessity is also examined. However, actually, it is still difficult to realize and operate the optimum system.

Further, in the POD market as mentioned above, actually, it is difficult to employ skillful workers as compared with the conventional print industry. Although there are such demands that it is intended to finish the job at low costs, do business at a small investment, reduce a TCO (Total Cost of Ownership), and the like, actually, such demands cannot be sufficiently satisfied because the POD market is still a new market. Problems to be solved are left.

In JP-A-H03-269756, a technique in which when a security requirement to print jobs is high, for example, in the case where it includes personal information or information for in-company use only, a personal identification number is allocated to the job has been disclosed. In JP-A-H04-331175, a technique in which access control by a password is made has been disclosed. In JP-A-H05-213519, a technique in which a key is physically provided for a stacker has been disclosed.

In the case of the print job, even if the access control is made by an electronic method such as a personal identification number or the like, product matter is paper, such access control is insufficient when security is assured.

Even if the access to the paper is restricted by locking, such a restriction is not interlocked with an access restriction of the electronic data, so that it is still insufficient to assure the security.

Further, even if an environment where a clean room serving as a spatial partition in which only the person whose entering/leaving has been permitted can enter and leave is prepared and specific apparatuses are made operative in the clean room is constructed, in the case where the number of jobs which need the security increases and the jobs cannot be fully processed even if only the specific apparatuses in the clean room are used or in the case where a device in the clean room is out of order, there is a situation that a short deadline for delivery cannot be assured.

SUMMARY OF THE INVENTION

It is, therefore, an object of the invention to provide workflow control apparatus and method which can control distribution of jobs while assuring security to the job whose security is necessary.

According to the invention, there is provided a job allocation control apparatus for controlling allocation of jobs to a clean device whose security has been assured and a non-clean device whose security is not assured, comprising: a security discrimination unit for discriminating whether or not the job has security setting; a target device determination unit for setting the job to a scheduling target to the clean device if it is discriminated by the security discrimination unit that the job has the security setting and setting the job to a scheduling target to the non-clean device if it is discriminated by the security discrimination unit that the job does not have the security setting; a rescheduling unit for setting the job having the security setting to the scheduling target to the non-clean device when a process of the job having the security setting which has been determined to be the scheduling target to the clean device by the target device determination unit cannot be executed; and a transmission control unit for discriminating whether or not the non-clean device satisfies a predetermined condition if the job having the security setting is set to the scheduling target to the non-clean device by the rescheduling unit and transmitting the job having the security setting to the non-clean device if the predetermined condition is satisfied.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 16 is a diagram showing an example of a GUI for log-in; and

DETAILED DESCRIPTION OF THE PREFERRED EMBODIMENTS

Embodiments of the invention will be described in detail hereinbelow with reference to the drawings.

First Embodiment (Construction of System)

Figure 1:
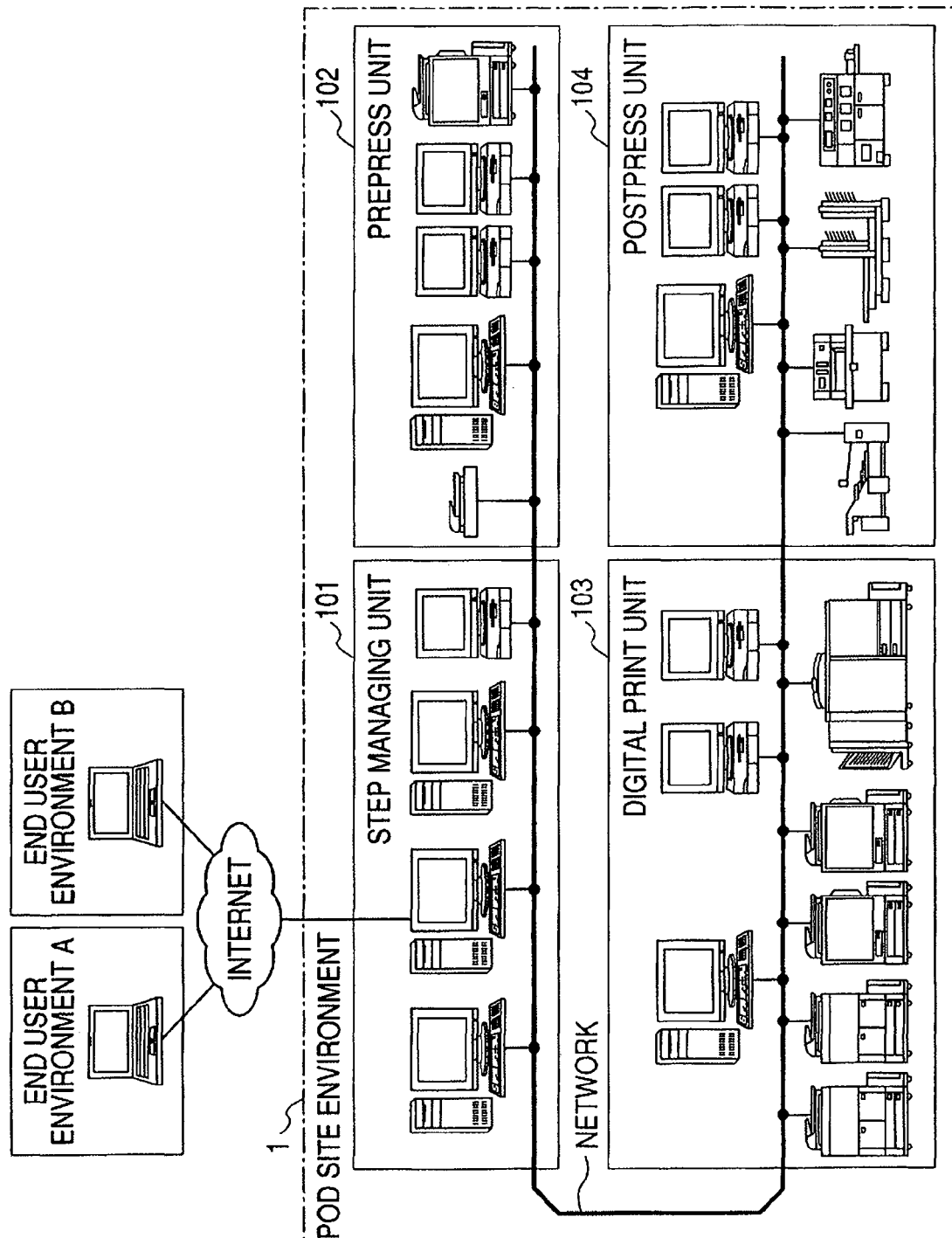
FIG. 1 is a block diagram showing an embodiment of the invention.

FIG. 1 shows a construction of a system. In this system, end user environments A and B and a POD (Print On Demand) site environment 1 are mutually connected through the Internet.

In each of the end user environments A and B, an orderer who requests the ordering of printing exists and a confirmation of a status of a job and the like as well as a request of a print job can be performed by using each client PC.

In the POD site environment 1, a step managing unit 101, a prepress unit 102, a digital print unit 103, and a postpress unit 104 are mutually connected through a network.

The step managing unit 101 instructs operations to the prepress unit 102, digital print unit 103, and postpress unit 104 in the POD site environment 1, unitarily manages a workflow of the present system constructed by a computer and various devices, and plays the following roles. That is, jobs are received from the end user environments A and B; the jobs from the end user environments A and B are held. On the basis of designation of the jobs from the end user environments A and B, the operations of the units of the POD site environment are assembled as a workflow. The operations in the devices or workers are scheduled so as to be efficiently executed.

The prepress unit 102 plays the following roles on the basis of operating instructions of a prepress job received from the step managing unit 101. That is, paper originals received from the end user environments A and B are scanned by a scanning device such as scanner/MFP or the like. Image data of the scanned paper originals is fetched as scan image files into a prepress server or a client PC. Image correction, merging of the files, insertion/deletion of pages, various page layout editions, or page layout process are executed. As necessary, a proof output to confirm a layout and coloring of a final product is executed.

The digital print unit 103 plays the following roles in accordance with the operating instructions of the prepress job received from the step managing unit 101 or the prepress unit 102. That is, the paper originals received from the end user environments A and B are copied by a scanning/printing device such as monochromatic MFP, color MFP, or the like. Document/image files received from the end user environments A and B from the client PC through a printer driver or a hot folder, scan image files obtained by scanning the paper originals by the scanning device, or the document/image files obtained by editing those files are printed out by the printing device such as monochromatic MFP, color MFP, or the like.

The postpress unit 104 plays the following roles in accordance with the operating instructions of a postpress job received from the step managing unit 101, prepress unit 102, or digital print unit 103. That is, post-processing devices such as paper-folding machine, saddle stitch book-binding machine, walnut book-binding machine, paper cutter, enclosing apparatus, collator, and the like are controlled. Finishing processes such as paper folding, saddle stitch book-binding, walnut book-binding, paper cutting, enclosing, collation, and the like are executed to recording paper outputted from the digital print unit 103.

(Construction of Step Managing Unit 101)

Figure 2:
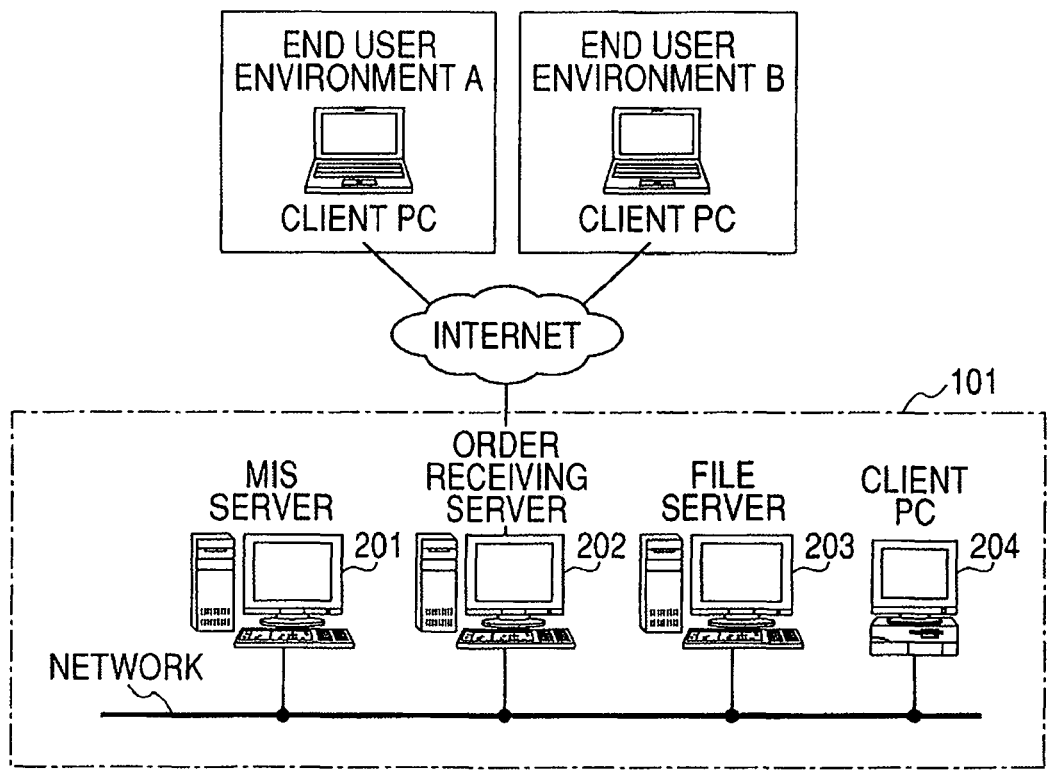
FIG. 2 is a block diagram showing a construction of a step managing unit 101 in FIG. 1.

FIG. 2 shows a construction of the step managing unit 101 in FIG. 1. In the step managing unit 101, an MIS server 201, an order receiving server 202, a file server 203, and a client PC 204 are mutually connected through the network. A job received by the step managing unit 101 is processed by transferring the job or issuing a control command. Naturally, the step managing unit 101 may be also constructed as a physically-one step managing server 101 (step managing apparatus) having functions of the MIS server 201, order receiving server 202, file server 203, and client PC 204. In the embodiment, explanation will be made on the assumption that step managing server 101 is constructed by a plurality of servers for every function.

As one of the principle functions of the step managing unit 101, there is a function as a system called an administration information system or an MIS (Management Information System) for collecting and analyzing information necessary for the decision making in management, administration, or the like of an enterprise. Generally, the MIS is a system for integratedly managing various management information and sales information including advertisement, order reception, estimation, scheduling, production, shipping, purchase, and sales. In particular, the MIS in the print industry has an aspect as a print producing step management system. The MIS can provide a mechanism for unitarily managing print production facilities and print production resources and automatizing a total workflow from the order reception to the delivery or cost collection by a job ticket called JDF (Job Definition Format) describing operating instructions in a job.

The MIS server 201 is a server computer functioning as a main device of the management information system. On the basis of designation of the jobs from the end user environments A and B, the MIS server 201 issues the JDF describing the operating instructions in the job to each unit in the POD site environment 1, thereby controlling the workflow of the system constructed by the computer and various devices.

The MIS server 201 exchanges a message called JMF (Job Messaging Format) between the MIS server 201 and each unit in the POD site environment 1 and unitarily manages the workflow of the system by obtaining function information and ability information which each device has, status information of each device, progress information of the received job, and the like.

Further, the MIS server 201 has functions as a workflow editor, a workflow engine, and a job scheduler. The MIS server 201 assembles the operations in each unit as a workflow, instructs to execute them, and efficiently schedules the operations in the devices or operators, so that the workflow in each unit can be also automatized.

A part of those functions can be also realized by an application installed in the client PC which is used by another worker different from the worker of the MIS server 201 in the step managing unit 101.

The order receiving server 202 is what is called a mediator of an electronic commerce (EC) in the POD and is a server for ordering and receiving the jobs from the client PCs of the end user environments A and B through a communicating medium such as Internet or the like. When the order receiving server 202 is seen from the end user environments A and B, it is a cyber shop using a Web page on the internet.

For example, if the job which the operator wants to request the ordering is a print job, user authentication is made by Browsers of the client PCs of the end user environments A and B. Thereafter, by inputting print condition setting to designate by which print condition the data should be outputted, other print request information, and the like, the document/image file serving as a print target is sent as electronic data together with the print condition setting, other print request information, and the like to the order receiving server 202 from the client PCs of the end user environments A and B through the Internet. The print job is ordered to the order receiving server 202 functioning as a Web server.

It is also possible to construct in such a manner that by providing the hot folder (not shown) for the order receiving server 202 or each client PC of the end user environments A and B, the document/image file serving as a print target and the print condition setting, other print request information, and the like associated by such a file can be transferred as data. The hot folder is a virtual folder including the print condition setting, other print request information, and the like as attributes. A plurality of hot folders can be formed in a memory unit (not shown) such as a hard disk or the like equipped for the order receiving server 202 or each client PC of the end user environments A and B. For example, when the end user environments A and B drag and drop the document/image file whose printing is requested to the hot folders from each client PC of the end user environments A and B, a monitoring program of the order receiving server 202 or each client PC of the end user environments A and B recognizes the existence of the document/image file and makes the print condition setting, other print request information, and the like be associated, thereby enabling the order receiving server 202 to read out those information.

If the job which the operator wants to order is a copy job, the document/image file is not transmitted as electronic data but, in place of it, the paper original serving as a copy target is separately sent as a physical medium by a home delivery service or the like and only copy condition setting to designate by which copy condition the data should be outputted and other copy request information are inputted from the browser of each client PC of the end user environments A and B. In this case, the operator judges the relationship between the paper original serving as a copy target which has separately been sent and the copy condition setting, other copy request information, and the like which have been transmitted to the order receiving server 202.

The file server 203 is a file server to store the jobs (the document/image file serving as a print target and the print condition setting, other print request information, and the like which are associated by such a file; the scan image file obtained by scanning the paper original serving as a copy target and the copy condition setting, other copy request information, and the like which are associated by such a file) received from the end user environments A and B in order to prepare for re-ordering according to the same original from the end user environments A and B.

For example, the order receiving server 202 stores the document/image files, as an inherent original as it is, of the print jobs received from the client PCs of the end user environments A and B into the memory unit (not shown) such as a hard disk or the like equipped for the file server 203 and holds them for a predetermined period of time. By this process, when the print jobs according to the same original from the end user environments A and B are re-ordered, the re-ordering can be processed without requesting the end user environments A and B to transmit the document/image files again.

The paper originals of the copy jobs received from the end user environments A and B are scanned, fetched as scan image files, after that, stored into the memory unit (not shown) such as a hard disk or the like equipped for the file server 203, and held for the predetermined period of time. By this process, when the copy jobs according to the same original from the end user environments A and B are re-ordered, the re-ordering can be processed without requesting the end user environments A and B to send the paper originals again.

Further, after the print jobs or the copy jobs were print-processed in output formats (the print condition setting, other print request information, and the like; the copy condition setting, other copy request information, and the like) which are desired by the end user environments A and B, the operator stores the edition-modified final document/image files or the print-processed final print data into the memory unit (not shown) such as a hard disk or the like equipped for the file server 203 and holds them for a predetermined period of time.

By this process, the operartions of the post-processing steps upon re-ordering from the end user environments A and B can be reduced.

(Construction of Prepress Unit 102)

Figure 3:
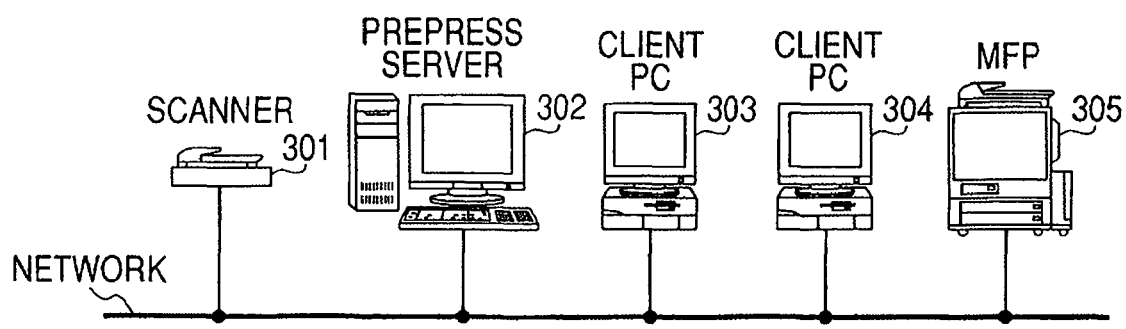
FIG. 3 is a block diagram showing a construction of a prepress unit 102 in FIG. 1.

FIG. 3 shows a construction of the prepress unit 102 in FIG. 1. In the prepress unit 102, a scanner 301, a prepress server 302, client PCs 303 and 304, and an MFP 305 are mutually connected through a network. By transferring a job or issuing a control command, the received job is processed in the prepress unit 102.

The prepress server 302 is a server constructed in such a manner that the paper originals received from the end user environments A and B are scanned by the scanning device such as scanner/MFP or the like, the image data of the scanned paper originals is fetched as scan image files, the image correction such as oblique movement correction, black dot removal, or the like is executed, a plurality of document/image files received from the end user environments A and B or a plurality of scan image files obtained by scanning the paper originals by the scanning device are merged, pages are inserted or deleted, and various kinds of page layout editions and page layout processes such as addition of page numbers or annotations, insertion of index paper, a paper cover, or insert sheet, designation of Nin1 printing or page repeat print, and the like are executed.

Although the prepress unit 102 in FIG. 3 has been described with respect to an example in which it includes one prepress server 302 and a plurality of client PCs 303 and 304, it can be also constructed only by a plurality of client PCs without using the prepress server.

If the job received from each of the end user environments A and B is a copy job, first, the operator scans the paper originals by the scanning device such as scanner/MFP or the like and fetches the obtained image data as scan image files into the prepress server 302 or the client PCs 303 and 304. If the fetched scan image is obliquely inclined, by executing the oblique movement correcting process, the inclination of the scan image is corrected. If the fetched scan image has punch holes or dust, by executing the black dot removing process, the punch holes or dust of the scan image can be removed.

If the job received from each of the end user environments A and B is a print job, first, the operator fetches the document/image files received from the end user environments A and B into the prepress server 302 or the client PCs 303 and 304.

If there are a plurality of document/image files received from the end user environments A and B or a plurality of scan image files obtained by scanning the paper originals by the scanning device, those files are merged.

Further, if it is necessary to further edit the document/image files received from the end user environments A and B or the scan image files obtained by scanning the paper originals by the scanning device, for example, the operator inserts pages from another file into an edition target file or deletes the pages of the edition target file while confirming the layout of a plurality of pages.

For example, the operator executes the following various kinds of page layout editions and page layout processes. That is, the page numbers or annotations (characters or an image such as watermark, logotype, or the like showing secret information) are added, the Nin1 printing or page repeat print (printing in which a plurality of pages are arranged on one print surface) is designated, the index paper, paper cover, or insert sheet is inserted, and a post-process such as stapling, punching, Z-folding, or the like is designated, and the like.

In the prepress unit 102, in order to realize one-to-one marketing such as address printing of direct mail or pamphlet per customer, it is also possible to construct a variable print system which exchanges addresses or related data and prints while printing a plurality of copies of the same document in an interlocking relational manner with a database constructed in the prepress server 302 or another server.

In the print industry, there is an output style called "color comprehensive layout" to make presentation to an advertiser prior to entering the book-binding and printing steps. In recent years, a color hard copy in which a digital color image processed by a DTP (Desk Top Publishing) to form a publication by using a personal computer or a CEPS (Color Electronic Prepress System) which is used for correction, synthesis, or the like of the image in a printing step is outputted by a color printer such as a color MFP or the like or a color plotter is used for the above color comprehensive layout.

In the POD using the printer such as an MFP or the like, the digital color image can be proof-outputted by the same color printer such as a color MFP or the like while including layout confirmation and simple coloring confirmation corresponding to the color comprehensive layout and detailed coloring confirmation corresponding to the proof.

In the prepress unit 102, the digital color image can be also proof-outputted to the MFP in order to confirm the layout and coloring of such a final product as necessary.

(Construction of Digital Print Unit 103)

Figure 4:
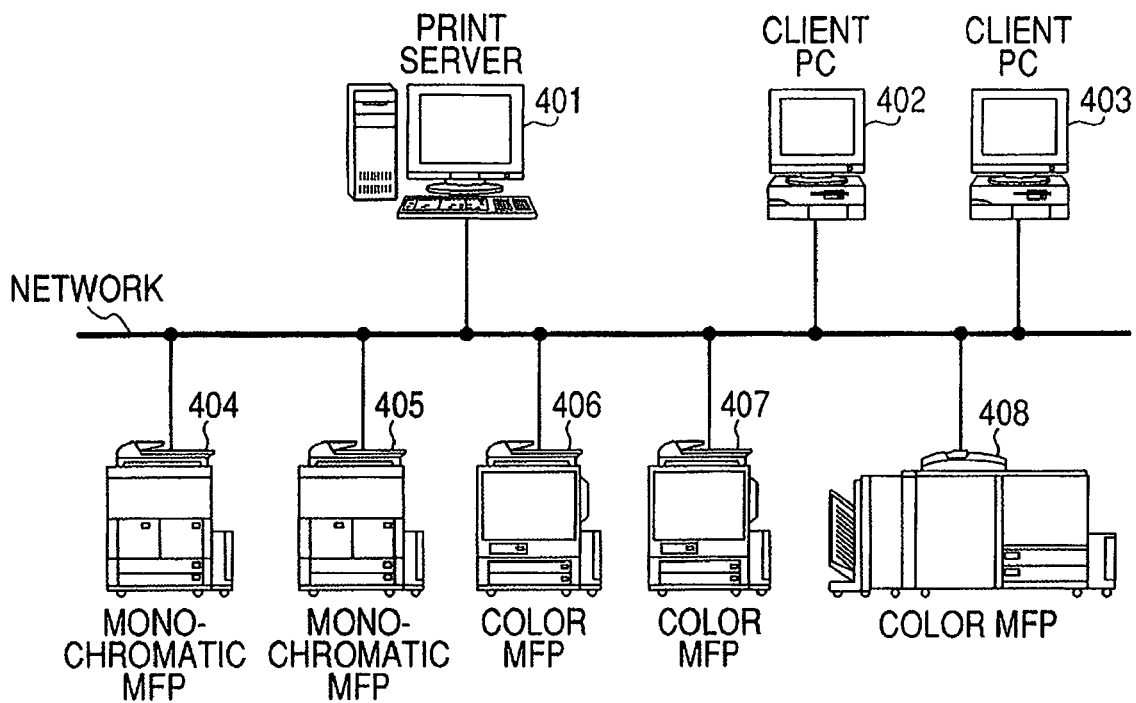
FIG. 4 is a block diagram showing a construction of a digital print unit 103 FIG. 1.

FIG. 4 shows a construction of the digital print unit 103 in FIG. 1). In the digital print unit 103, a print server 401, client PCs 402 and 403, monochromatic MFPs 404 and 405, and color MFPs 406 to 408 are mutually connected through a network.

The print server 401 has the following two roles. First, it has the role of transmitting and receiving information to/from the outside of the digital print unit 103. First, the image information, setting information, and the like of the job which is sent are inputted to the print server 401. When the job is finished, information such as a status or the like is notified to the outside. Second, it has the role of management control in the digital print unit 103. Jobs inputted from the outside and jobs generated in the digital print unit 103 are unitarily managed by the print server 401. Situations of all devices and all jobs provided in the digital print unit 103 can be monitored. Temporary stop of the job, setting change, print restart, or control of copy, movement, deletion, or the like of the job can be performed.

The client PCs 402 and 403 have a role of editing an inputted application file, instructing the printing, or inputting a print ready file and a role of assisting the monitoring and control of the devices and jobs which are managed in the print server 401.

Each of the monochromatic MFPs 404 and 405 and the color MFPs 406 to 408 is an image forming apparatus having various functions for scanning, printing, copying, and the like. Since print speeds, costs, and the like of the color MFPs 406 to 408 and those of the monochromatic MFPs 404 and 405 are different, it is necessary to selectively use them in accordance with the use fields.

(Assuring of Security)

Figure 5:
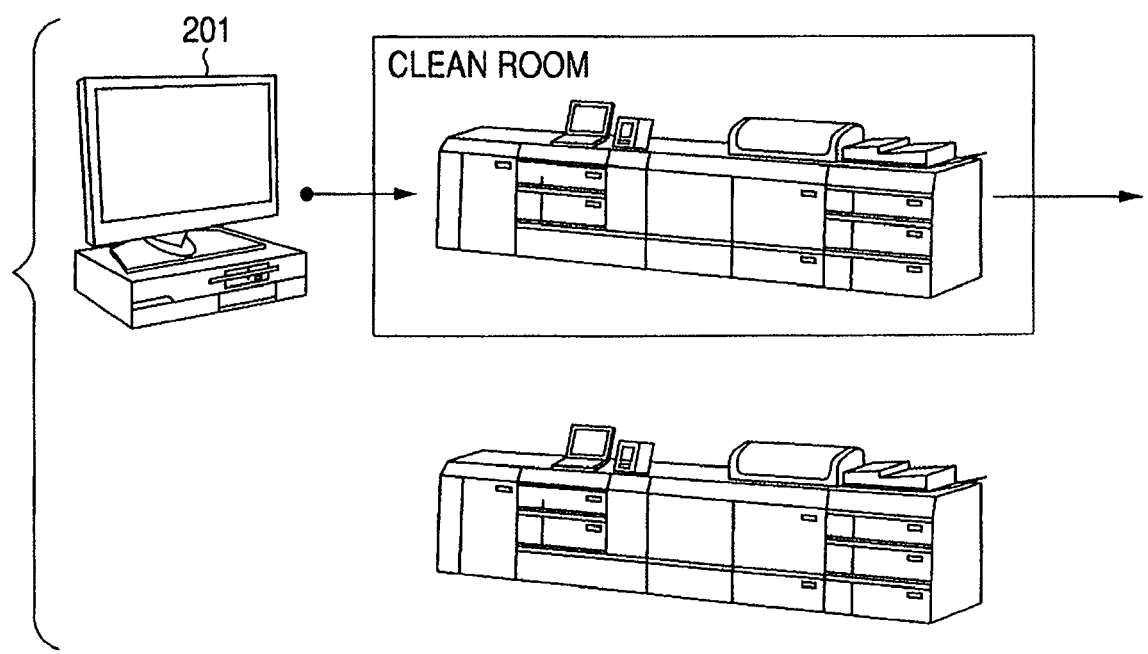
FIG. 5 is an explanatory diagram for explaining a construction to assure the security by a clean room.

Even in the POD site environment 1, for example, in the case of a job in which personal information such as a customer address and the like or information for in-company use only has been disclosed, since it is demanded to enhance the security for the job, it is necessary to prevent outflow of those information. Therefore, to prevent the outflow of those information, there is considered a method whereby apparatuses such as output printer, folding machine, and the like in which a possibility of leakage of the information included in the job is high are arranged in a space such as a room or the like where only the persons who were permitted to enter and leave the room can enter and leave (such a space is called a "clean room" and a space other the clean room is called a "non-clean room" hereinbelow), the jobs in which it is demanded to assure the security are sent to the apparatuses in such a room, and the jobs are processed by those apparatuses. For example, in FIG. 5, there is considered a method whereby if there is security setting in the inputted job, this job is sent to the apparatuses in the clean room by the MIS server 201.

It is assumed that each of the prepress apparatuses, press apparatuses, and postpress apparatuses arranged in the clean room is called a "clean device" or "security printing apparatus (or security printer)" and each of the apparatuses arranged in the "non-clean room" is called a "non-clean device" or "non-security printing apparatus (or non-security printer)". Further, the human operator who was permitted to enter and leave the clean room is called a "clean operator" and each of other human operators is called a "non-clean operator".

Figure 7:
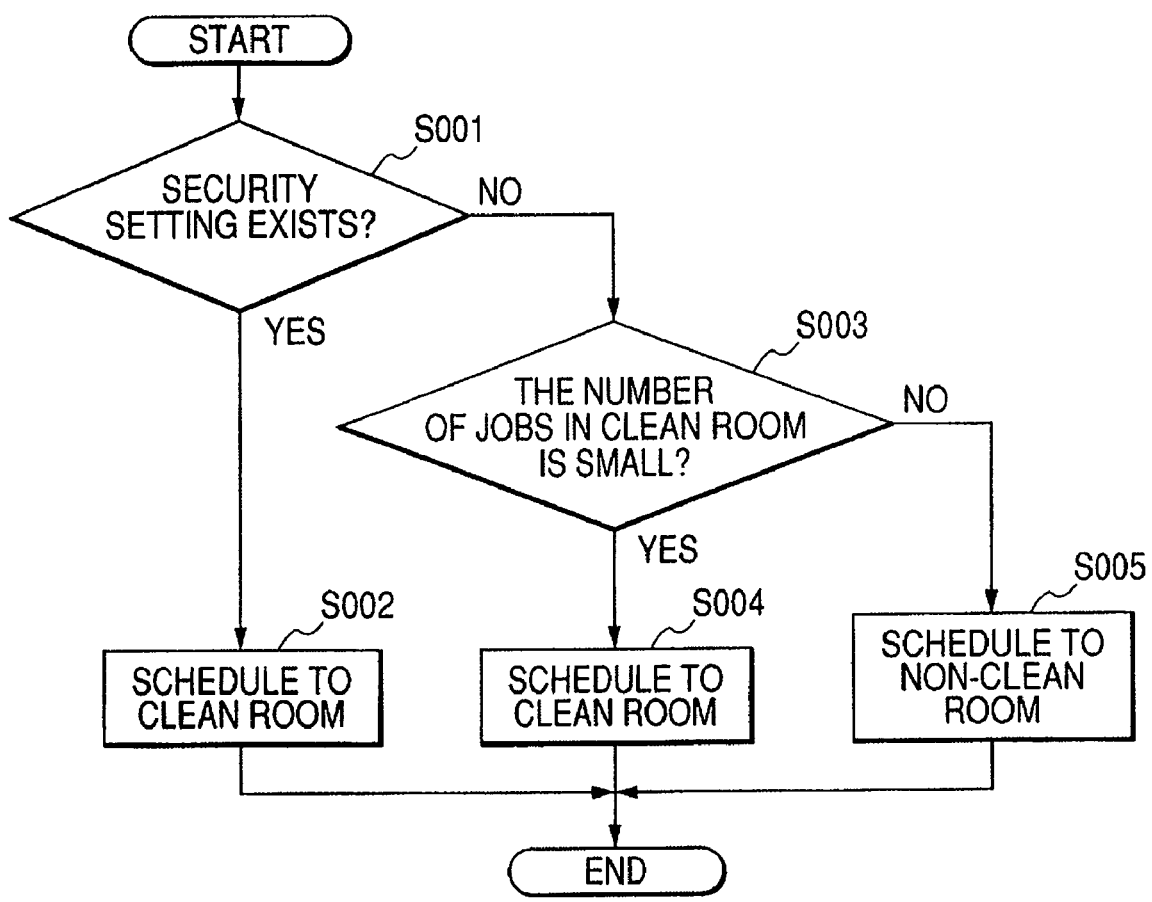
FIG. 7 is a flowchart showing an example of a workflow control procedure by an MIS server 201.

FIG. 7 is a flowchart showing an example of a workflow control procedure by the MIS server 201 in the step managing server 101. First, in step S001, the MIS server 201 analyzes the job received from the client PC of the end user environment through the Internet by the order receiving server 202, thereby discriminating whether or not there is security setting in the job. It is assumed that the security setting of the job has been defined as one attribute of the job like postpress setting such as the number of print copies, deadline for delivery, staple, or the like. If it is determined that there is the security setting, the job is set to a scheduling target to the clean device in step S002.

Figure 6:
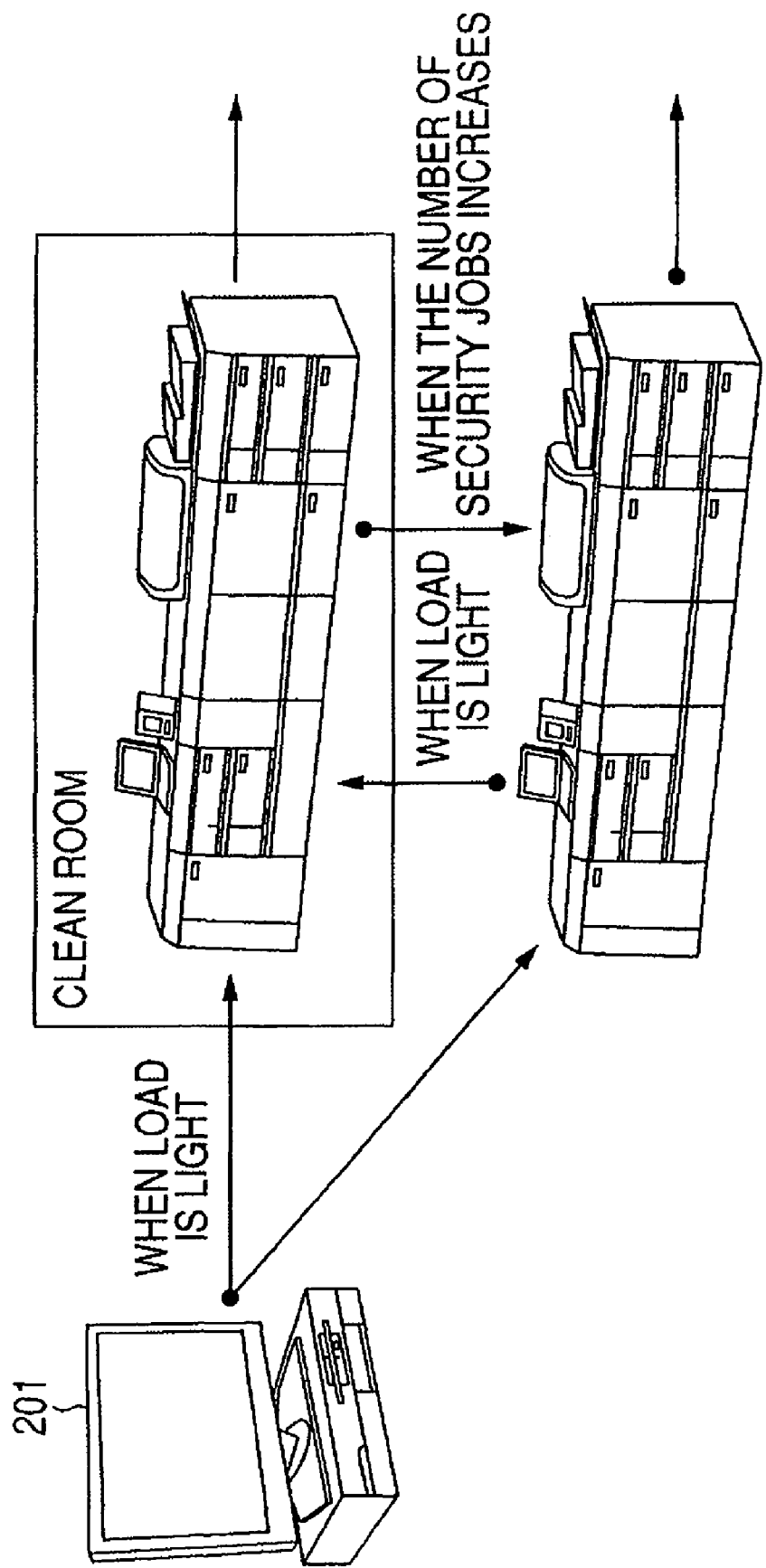
FIG. 6 is an explanatory diagram for explaining a flow for jobs having no security setting.

On the other hand, if it is determined that there is no security setting, in step S003, the MIS server 201 examines a balance of an amount of jobs distributed to the clean devices and an amount of jobs distributed to the non-clean devices, thereby discriminating whether or not an amount of jobs allocated to the clean room is small. In the MIS server 201, job allocation tables of the jobs allocated to the clean devices and the non-clean devices have been stored in a memory and are managed. Therefore, the MIS server 201 can recognize the amount of jobs allocated to the clean devices and the amount of jobs allocated to the non-clean devices (can recognize a print amount from a paper size, the number of pages, and the number of print copies). If it is decided that the amount of jobs distributed to the clean devices is small and, even if an additional job is inputted to the clean devices, the jobs which have already been distributed to the clean devices will be processed in the deadline for delivery by the clean devices, the relevant job is set to the scheduling target to the clean device in step S004. On the other hand, if there is no difference between the amount of jobs distributed to the clean devices and the amount of jobs distributed to the non-clean devices or the amount of jobs distributed to the clean devices is larger than the amount of jobs distributed to the non-clean devices, the relevant job is set to the scheduling target to the non-clean device in step S005. A flow for the jobs having no security setting mentioned above is shown in FIG. 6.

If the amount of jobs distributed to the non-clean devices is not proper, the jobs having no security setting are controlled and distributed to the clean devices as mentioned above. However, the non-clean operator cannot enter and leave the clean room where the clean devices have been arranged but only the clean operator can enter and leave the clean room as mentioned above. Therefore, in such a case, the security to other clean devices in the clean room is assured.

Figure 8:
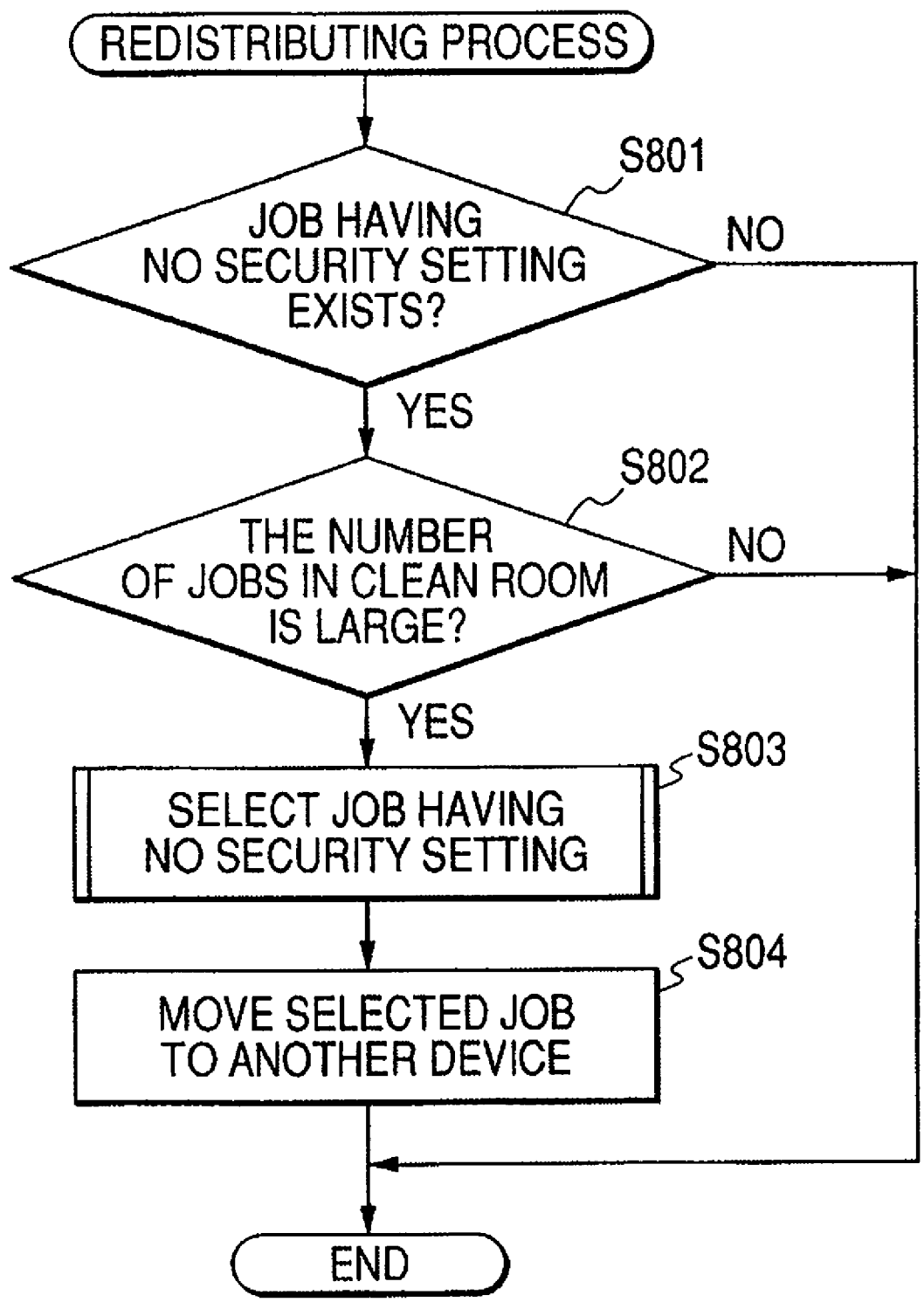
FIG. 8 is a flowchart showing an example of a rescheduling procedure between a clean device and a non-clean device.

FIG. 8 is a flowchart showing an example of a rescheduling procedure between the clean device and the non-clean device. First, in step S801, the MIS server 201 discriminates whether or not the jobs having no security setting have been scheduled in the present schedule of the clean device. In the present schedule to the clean device, if the jobs having no security setting exist, the processing routine advances to step S802. In step S802, the MIS server 201 examines an amount of jobs scheduled to the clean devices and the non-clean devices on the basis of the job allocation tables managed in its own memory. If the amount of jobs scheduled to the clean devices is larger because of the addition to the new job, the jobs having no security setting are selected from the schedule of the present clean device in step S803. The rescheduling for setting the selected job to the scheduling target to the non-clean devices is executed in step S804.

On the other hand, in step S802, if the amount of jobs to the clean devices does not reach the maximum job amount even if the new job is added, that is, if there is a surplus of the amount of jobs to be processed of the clean devices, the present processing routine is finished.

On the other hand, in step S801, if the jobs having no security setting are not scheduled to the clean devices, since there is no scheduling target to the non-clean devices, the present processing routine is finished.

Figure 9:
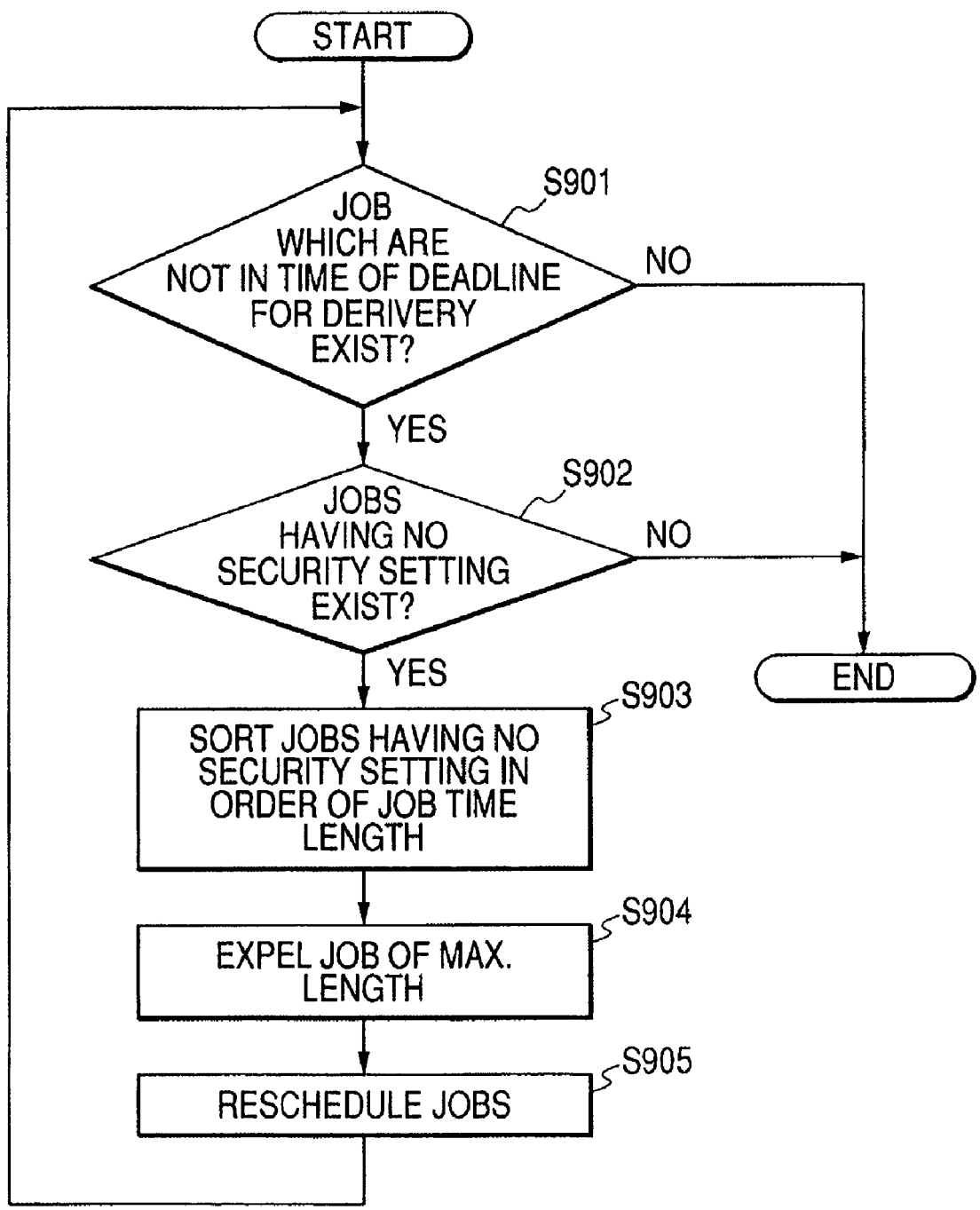
FIG. 9 is a flowchart showing a process of step S803 in FIG. 8 in more detail.

FIG. 9 is a flowchart showing a process of step S803 in FIG. 8 in more detail. In step S901, on the basis of the job allocation table, the MIS server 201 discriminates whether or not the jobs which cannot be in time of the deadline for delivery in the schedule to the clean devices exist. The job allocation table has been prepared every device. The amount of allocated jobs and processing time (prediction time) of each job have been described in the table. The MIS server 201 can make schedule management of each job by using the job allocation table. If it is decided that there are no jobs which cannot be in time of the deadline for delivery, the rescheduling of the jobs to the non-clean devices is not performed on the assumption that the rescheduling is avoided as much as possible. After that, the present processing routine is finished.

On the other hand, if it is decided in step S901 that there are the jobs which cannot be in time of the deadline for delivery, the MIS server 201 discriminates whether or not the jobs having no security setting have been scheduled to the clean devices in step S902. If the jobs having no security setting are not scheduled to the clean devices, since there are no expelling targets to the non-clean devices, the present processing routine is finished after that.

On the other hand, in step S902, if the jobs having no security setting have been scheduled to the clean devices, the MIS server 201 sorts the jobs having no security setting in descending order of the job amounts (job data sizes) in step S903. In step S904, the job of the maximum job amount is selected from the sorted jobs and set to the scheduling target to the non-clean devices. By selecting the job of the maximum job amount, even if there is an additional job later, a possibility that the delivery time exceeds the deadline for delivery due to the processes by the clean devices is low by the discrimination of step S901. Therefore, a frequency of the rescheduling can be decreased.

In step S905, the MIS server 201 executes the rescheduling to the residual jobs removed from the schedule of the clean devices in step S904. After that, the processing routine is returned to step S901. In step S901, the MIS server 201 discriminates whether or not the jobs which cannot be in time of the schedule exist. The reason why the processing routine is looped as mentioned above is that there is a case where even if one job was expelled, the imbalance is not eliminated yet when a size of job newly added to the clean devices is large.

By looping the processing routine, the jobs of an amount enough to eliminate the imbalance can be set to the expelling targets.

(Fault Occurrence in Clean Device)

Figure 10:
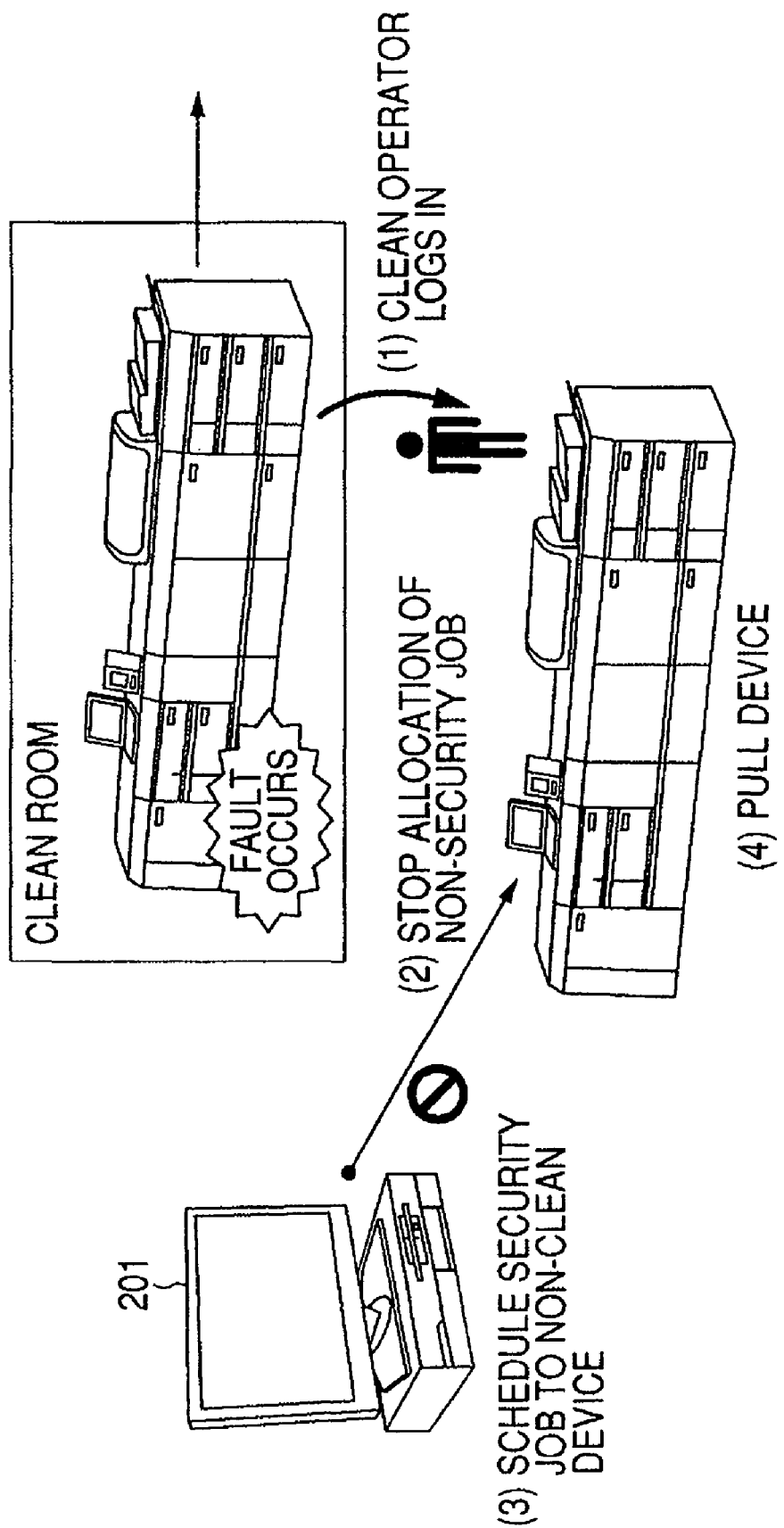
FIG. 10 is an explanatory diagram for explaining a flow of a job in the case where a fault occurs in the clean device.

When a fault occurs in the clean device, if the jobs having the security setting are scheduled to the non-clean devices, a meaning that the security is assured by arranging the clean devices into the clean room is lost and the security to those jobs becomes low. In the embodiment, therefore, when the fault occurs in the clean device, the following countermeasure is taken. That is, explanation will be made with reference to FIG. 10.

(1) When the fault occurs in the clean device, the clean operator who found the fault occurrence logs in the non-clean device. Thus, the MIS server 201 is notified that this non-clean device functions as a clean device in which the security has been assured by the clean operator (hereinbelow, such a device which functions as a clean device is called a "cleaned device").

(2) The MIS server 201 which received such a notification interrupts a workflow of the jobs having no security setting which has been made to the clean device. That is, the MIS server 201 sends a cancelling instruction of the print job which has already been transmitted to the clean device and, thereafter, stops the schedule of the print jobs having no security setting which have been scheduled to this device until predetermined conditions are satisfied.

(3) The MIS server 201 preferentially schedules the jobs having the security setting to this cleaned device.

(4) Job data of the jobs having the security setting is pulled from this cleaned device side. This point differs from the ordinary job flow.

Figure 11:
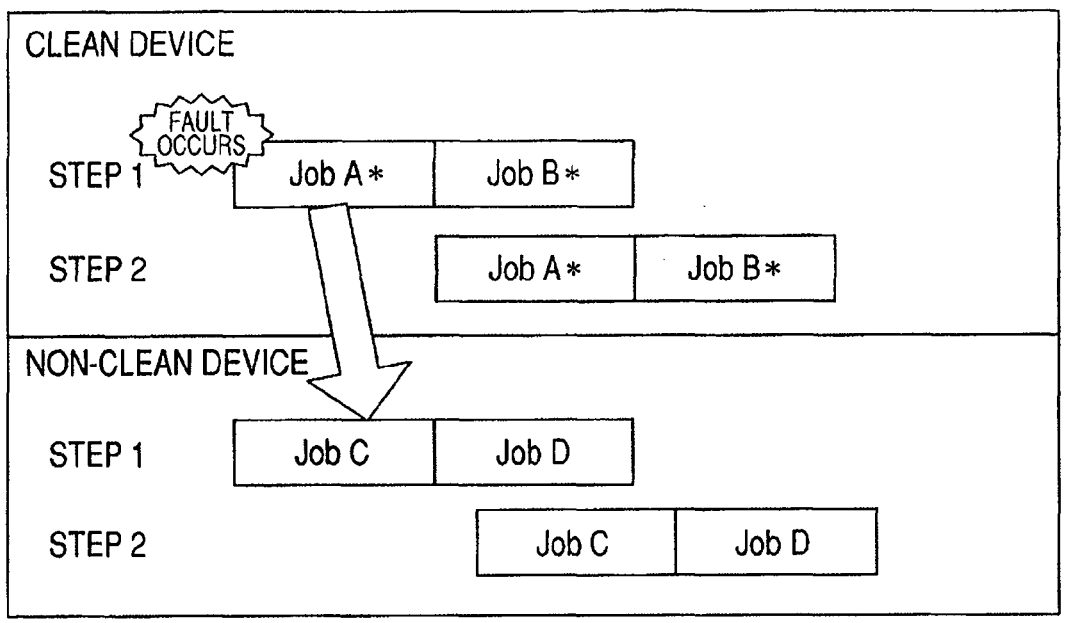
FIG. 11 is an explanatory diagram for explaining scheduling by the MIS server 201 in the case where the fault occurs in the clean device.
Figure 12:
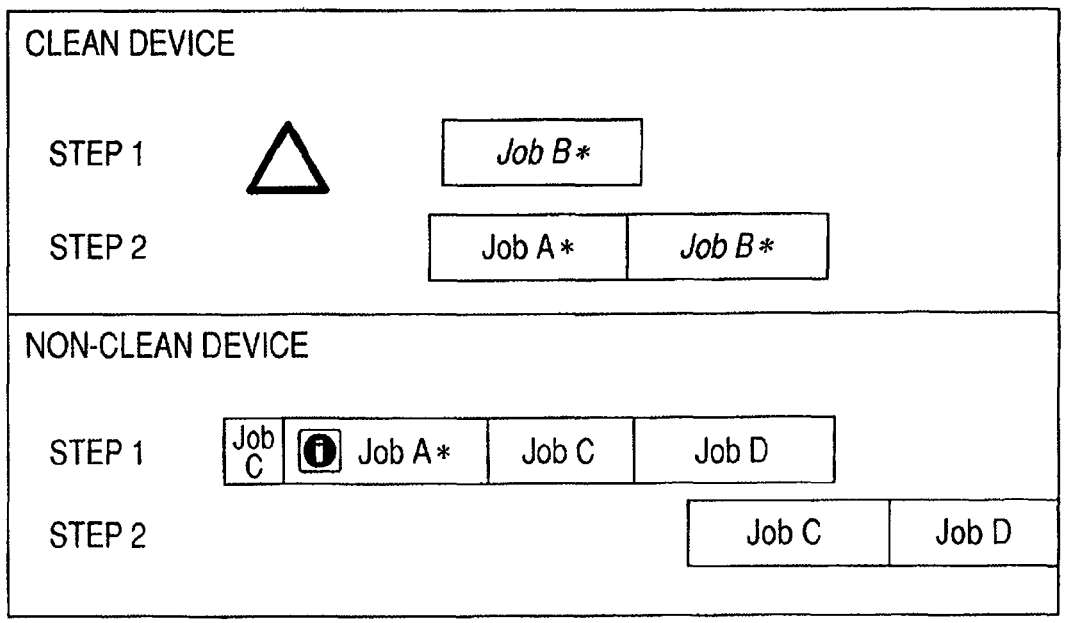
FIG. 12 is an explanatory diagram for explaining the scheduling by the MIS server 201 in the case where the fault occurs in the clean device.

A scheduling change by the MIS server 201 in the case where the fault occurred in the clean device will now be described with reference to FIGS. 11 and 12. FIG. 11 shows schedules of the jobs just before the occurrence of the fault. The schedule of the clean devices is shown in the upper half. The schedule of the non-clean devices is shown in the lower half. It is now assumed that two processing steps can be executed by two kinds of devices.

According to those schedules, two jobs of JobA and JobB have sequentially been scheduled for the clean devices which play roles of steps 1 and 2. The jobs to each of which an asterisk (*) has been added are jobs having the security setting and other jobs are jobs having no security setting. Similarly, two jobs of JobC and JobD have also been scheduled for the non-clean devices which play the roles of steps 1 and 2.

For example, if a fault occurred in the first clean device which plays the role of step 1 (for example, in the case where step 1 is a press process (printing process)), the MIS server 201 detects the occurrence of the fault of the clean device, and it is determined that a proxy process of the job is necessary, the MIS server 201 searches for the non-clean device which can proxy-process the job JobA which has been scheduled in the clean device (which plays the role of step 1) in which such a fault occurred, that is, the non-clean device which plays the role of step 1. When the non-clean device which plays the role of step 1 is searched for, the MIS server 201 notifies the clean operator that the searched non-clean device can be used as a clean device. As a notifying method, such a fact can be displayed on a display of the MIS server 201 or it is also possible to call a personal digital assistant of the clean operator and notify him of such a fact. When the clean operator logs in the notified non-clean device and the MIS server 201 is notified that the non-clean device has been logged in, the MIS server 201 sets the non-clean device which has been logged in by the clean operator to the cleaned device and instructs the cleaned device to interrupt the job which is at present being processed. Thus, although step 1 of the job JobC is interrupted during the process, this non-clean device cannot be immediately stopped and the processes of the number as many as the number of print copies which are being executed are executed to the end. A part of the job JobC remains in the non-clean device which plays the role of step 1 due to switching preparation or the like of the jobs.

After that, the job JobA which has been scheduled to the clean device is scheduled to the searched non-clean device by the MIS server 201 and the job allocation table of each device is updated. In the schedule (refer to FIG. 12) after the rescheduling, the clean device in which the fault has occurred is shown by an icon of a triangle. The asterisk showing the job in which the security has been set is added and an icon (i) showing that the scheduling is not the ordinary scheduling is added to the job JobA.

When the process of the job JobA is normally finished and the fault of the clean device is recovered during such a period of time, in the schedule of the cleaned device (non-clean device), a residual part of the job JobC and the job JobD mentioned above are shifted. Since the job JobC and the job JobD are shifted, the schedule of step 2 as a post process is also shifted back.

Since no fault occurs in the second clean device which plays the role of step 2 (for example, in the case where step 2 is a postpress process (finishing process or the like)), there is no need to schedule the job to the non-clean device. However, the start time of the job JobA is shifted in accordance with the end time of step 1 of the job JobA.

Since the job JobB has been allocated to the clean device having the fault at present (refer to FIG. 1), if the fault of the first clean device is not recovered even after the start time comes, the rescheduling is executed in a manner similar to the case of the job JobA. A job name of the job in which a possibility of the rescheduling remains is shown by an italic type.

Figure 13:
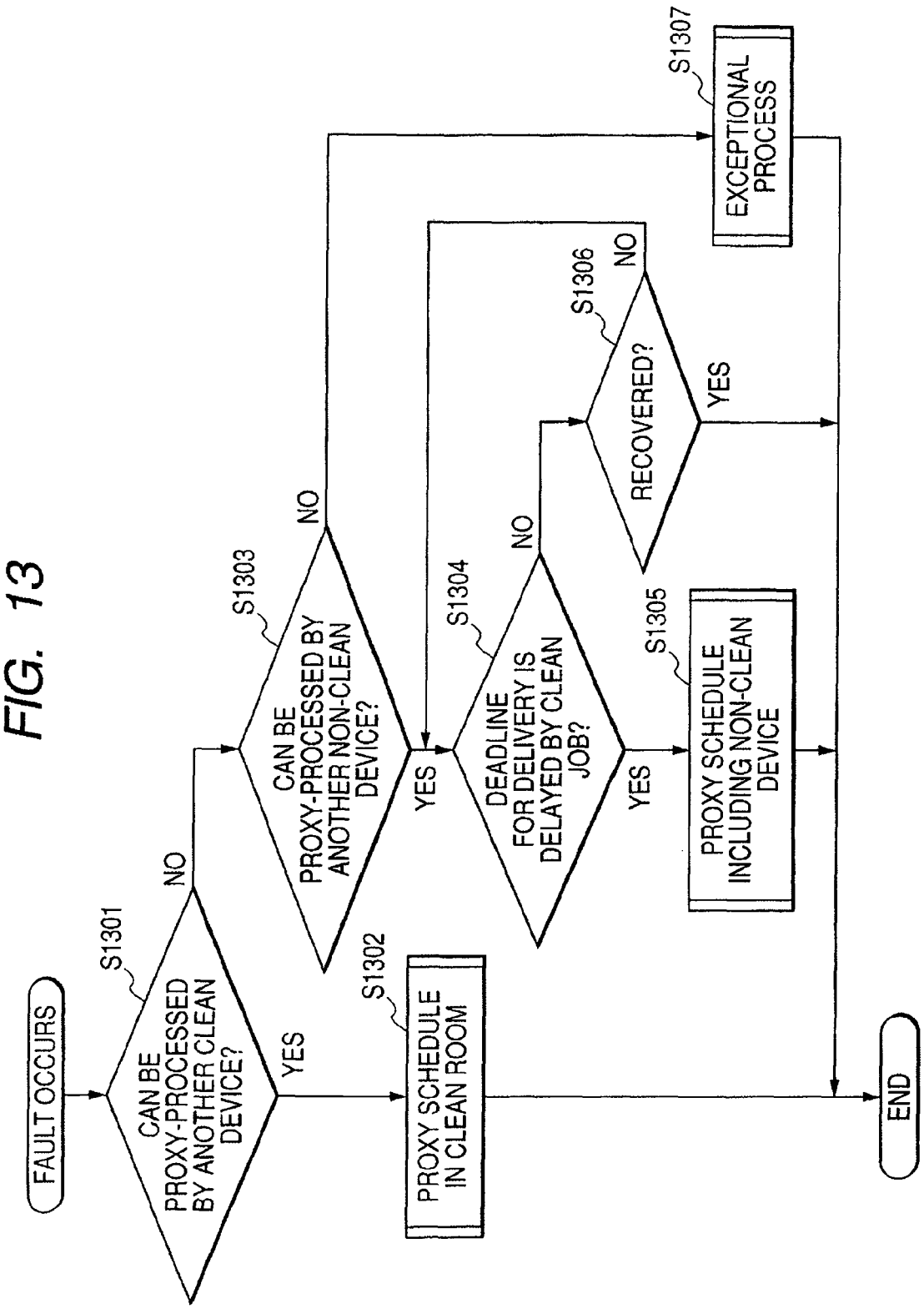
FIG. 13 is a flowchart showing an example of a proxy processing procedure when a fault occurs.

FIG. 13 is a flowchart showing an example of a proxy processing procedure when the fault of the clean device occurs. When the occurrence of the fault of the clean device is detected by the MIS server 201, the proxy process is started. In step S1301, whether or not the processes of the job allocated to the clean device in which the fault occurred can be proxy-processed by another clean device is discriminated. If it is determined that they can be proxy-processed by another clean device, step S1302 follows. For example, in the case where a staple process is being executed in an on-line manner, if another clean device which can perform the on-line staple process exists or a clean device having a printer and an off-line stapler exists, similar processes can be executed even if the non-clean device is not used. In step S1302, the rescheduling for allowing the proxy process to be performed by another clean device is executed. As for the job which was rescheduled to the clean device, when the scheduling time comes, the MIS server 201 push-transmits the job having the security setting to the clean device, thereby allowing the clean device to execute the processes.

If there are no other clean devices which can perform the proxy-process, the MIS server 201 discriminates whether or not the processes can be proxy-processed by the non-clean device. In the case of the job which needs a step using a special device which exists only in the clean devices, the processes cannot be proxy-processed. If they can be proxy-processed by the non-clean device, in step S1304, the MIS server 201 discriminates whether or not the deadline for delivery cannot be assured due to the fault occurrence on the basis of the schedule of the job having the security setting in the job allocation table. This is because if the deadline for delivery can be assured, it is sufficient to merely shift the schedule back after waiting until the fault is recovered.

If it is decided that the deadline for delivery cannot be assured, the MIS server 201 executes the rescheduling of all of the devices including the non-clean devices in step S1305. On the other hand, if it is decided that the deadline for delivery can be assured, the MIS server 201 discriminates whether or not the device fault has been recovered in step S1306. If it is recovered, the schedule is merely shifted to the timing by the stop time of the device caused by the fault and the proxy process is not executed. After that, the processing routine is finished. On the other hand, if the device fault is not recovered, the processing routine is returned to step S1304 and whether or not the deadline for delivery cannot be assured is discriminated again in step S1304. It is sufficient to periodically execute a loop of steps S1304 and S1306 at predetermined time intervals.

On the other hand, if it is decided in step S1303 that the processes cannot be proxy-processed by the non-clean device, an exceptional process is executed in step S1307. A message showing that they cannot be proxy-processed is displayed to the operator and, thereafter, the processing routine is finished. In this case, the operator takes a countermeasure such as proxy to another branch or subcontractor, notification of the schedule delay to the ordering source, or the like or takes a countermeasure such as waiting for the recovery of the device or the like.

Figure 14:
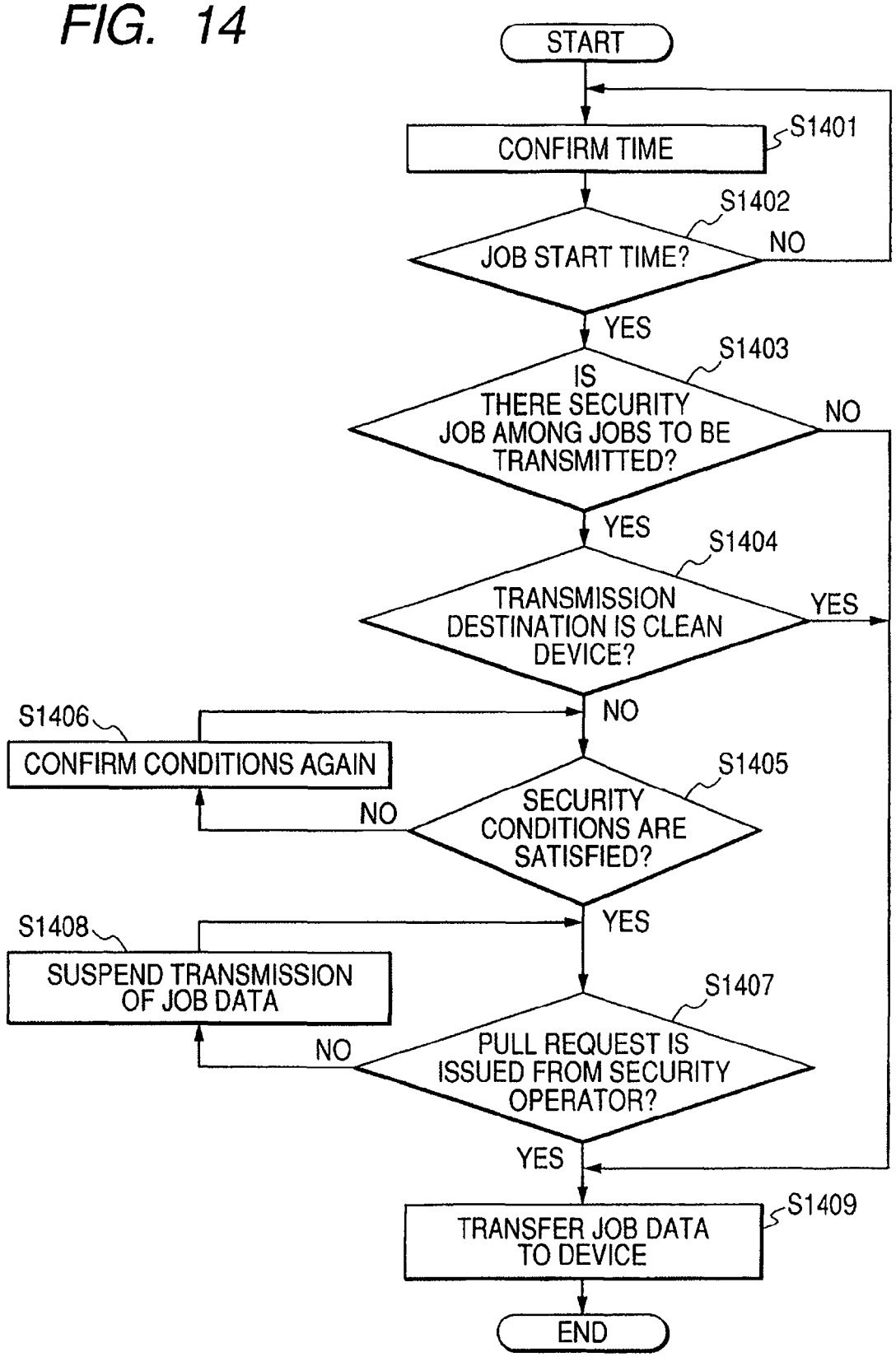
FIG. 14 is a flowchart showing an example of a job data transmitting process by the MIS server 201.

FIG. 14 is a flowchart showing an example of a job data transmitting process by the MIS server 201. In step S1401, the present time is confirmed. In step S1402, the operator examines in which step the present time indicates the start time. If the present time is not time when the step can be newly started, the processing routine is returned to step S1401. The time is confirmed again after the elapse of the predetermined time in step S1401.

If the present time is the time when the step can be started, the MIS server 201 discriminates whether or not the job in which the step can be started has the security setting. If there is no security setting, the job is transmitted to a transmission destination device (device allocated by the job allocation table: corresponds to the non-clean device here) in step S1409. The processes of this job are executed by the transmission destination device.

On the other hand, if it is decided in step S1403 that the job has the security setting, whether or not the transmission destination of the job is the clean device is discriminated in step S1404. If it is determined that the transmission destination of the job is the clean device, that is, if the security for the device has been assured, the processing routine advances to step S1409.

On the other hand, if it is decided that the transmission destination of the job is not the clean device due to the fault of the clean device as mentioned above, in step S1405, the MIS server 201 discriminates whether or not the conditions in which the job having the security setting can be processed in the non-clean device are satisfied. For example, the MIS server 201 discriminates whether or not the operator who cannot handle the job having the security setting, that is, the non-clean operator is operating the device of the transmission destination by checking whether or not the non-clean operator has logged off from the device of the transmission destination. The MIS server 201 also discriminates whether or not the clean operator has logged in the device of the transmission destination. If the non-clean operator does not log off from the device of the transmission destination yet and is operating the device of the transmission destination, the conditions are not satisfied. Therefore, in step S1406, it is confirmed again that the conditions in which the job having the security setting can be processed in the non-clean device are satisfied, then step S1405 follows. After that, the loop of steps S1405 and S1406 is repeated until the conditions are satisfied.

If it is determined in step S1405 that the non-clean operator does not log in and the clean operator has logged in and the conditions are satisfied, step S1407 follows. In step S1407, the MIS server 201 discriminates whether or not there is a data pull request from the clean operator. When the clean operator logs in the cleaned device, a list of the scheduled jobs having the security setting is obtained from the MIS server 201 and displayed on a display unit of the cleaned device, the jobs are selected from the displayed job list, and it is instructed to obtain them, so that the data pull request is issued from the cleaned device to the MIS server 201. If the data pull request is received, step S1409 follows. If the data pull request is not issued, job data transmission is suspended in step S1408 and step S1407 follows. After that, the loop of steps S1407 and S1408 is repeated until the pull request is issued from the clean operator.

As mentioned above, by making the double check in steps S1405 and S1407 with respect to the security, the security to the job having the security setting can be assured.

Figure 15:
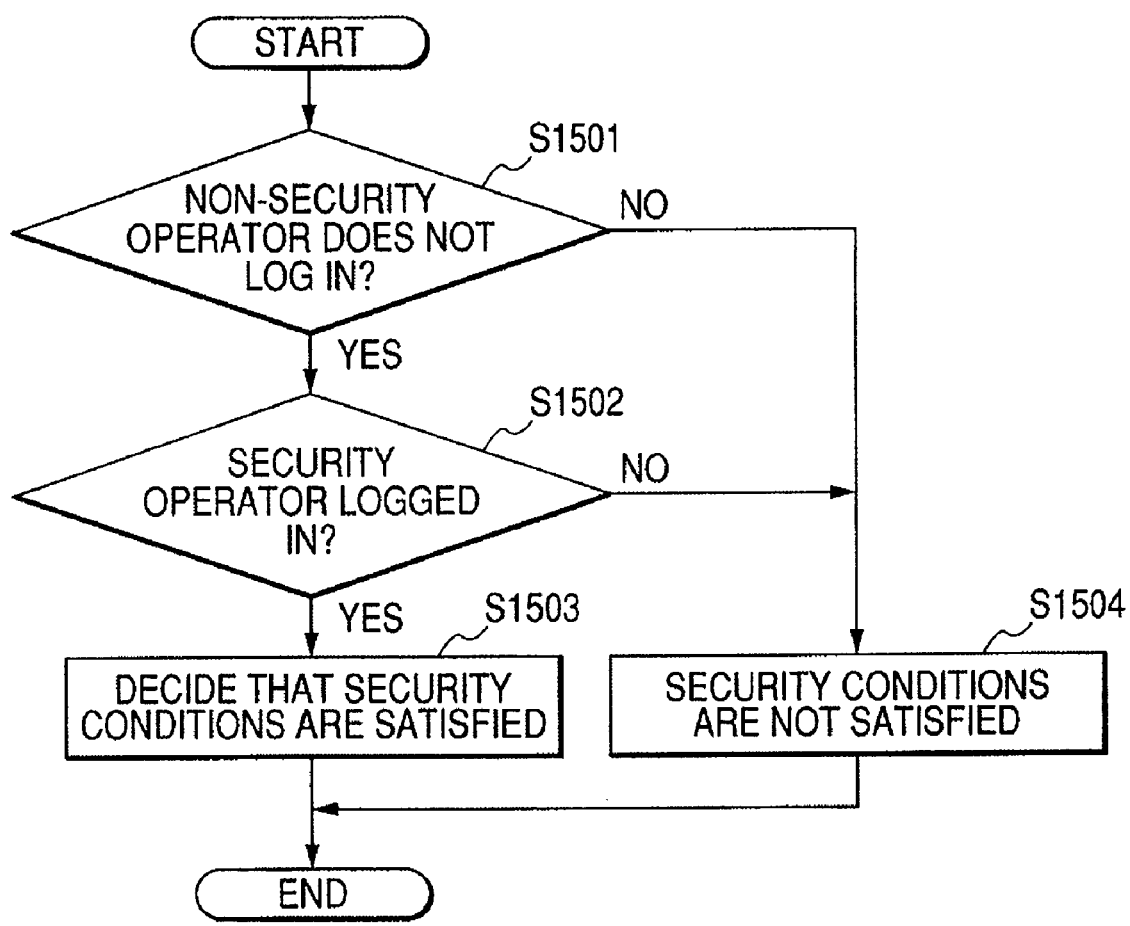
FIG. 15 is a flowchart showing a procedure of step S1405 in FIG. 14 in more detail.

FIG. 15 is a flowchart showing in more detail step S1405 in FIG. 14, that is, the process to discriminate whether or not the conditions in which the job having the security setting can be processed in the non-clean device are satisfied. In step S1501, the MIS server 201 discriminates whether or not the non-clean operator has already logged in the device of the transmission destination. In the embodiment, all devices have log-in means and the log-in and log-off by the operator is managed by the log-in means. If the non-clean operator has already logged in, it is decided in step S1504 that the security conditions are not satisfied.

On the other hand, if the non-clean operator does not log in, whether or not the clean operator has logged in is discriminated in step S1502. If the clean operator does not log in, nobody logs in the relevant device. However, since the log-in by the non-clean operator is also possible for the clean operator, the processing routine advances to step S1504.

If the clean operator has already logged in in step S1502, it is decided in step S1503 that the security conditions are satisfied.

Although the log-in situation is examined in steps S1501 and S1502 as mentioned above, the discrimination target is not limited to the device to which the steps are distributed but can be set to a plurality of groups of devices. This is because, for example, in the case where three non-clean devices are arranged in a certain non-clean room, when the job having the security setting is transmitted to one of the three non-clean devices, in all of the three non-clean devices, whether or not the security conditions are satisfied should be confirmed.

In a step such as a wrapping step in which concealment of data is high, there is also a case where it is sufficient if the security conditions are discriminated only in a wrapping device.

To decide a range where the conditions are discriminated, it is necessary to make grouping setting in dependence on a kind of device and a layout method.

Figure 16:
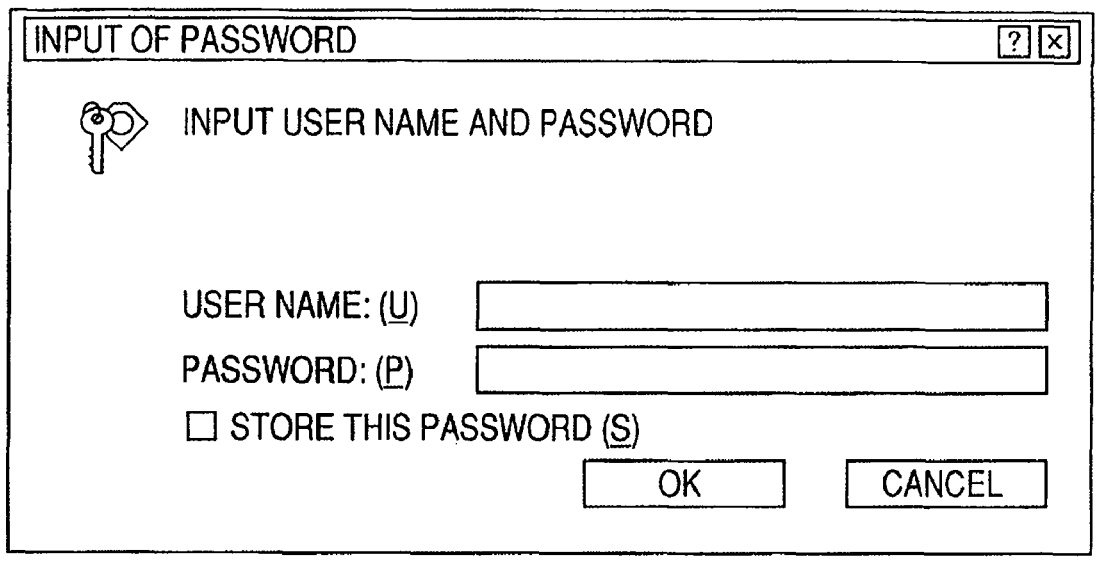

To log in the device, for example, a GUI (Graphic User Interface) as shown in FIG. 16 is displayed on an operation unit of each device and the log-in can be performed in an interactive manner by the GUI, or the log-in can be also performed by an IC card or the like.

Figure 17:
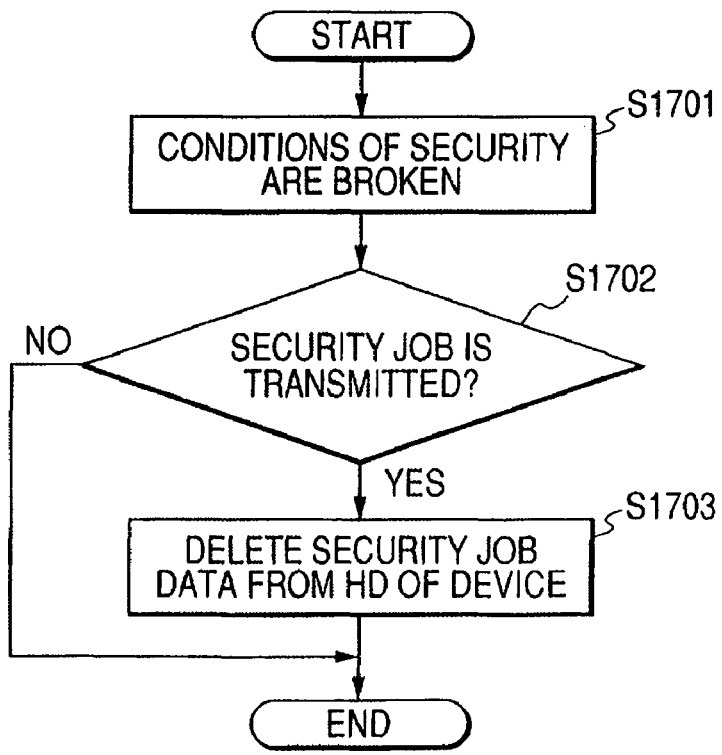
FIG. 17 is a flowchart showing an example of a post-process which is executed to the non-clean device by a workflow manager.

FIG. 17 is a flowchart showing an example of a post-process which is executed to the non-clean device by a workflow manager in the case where the clean operator leaves this working spot because of the recovery or the like of the fault of the clean device. In step S1701, when the security conditions are broken by the log-off of the clean operator, the log-in of the non-clean operator to the group devices, or the like, whether or not the security job has been transmitted to the non-clean device is discriminated in step S1702. If the job having the security setting is not proxy-processed, this process is finished after that. If the job having the security setting has been proxy-processed, data of the job having the security setting is deleted from a hard disk provided in the apparatus or an external storage device such as a memory or the like in step S1703.

As many apparently widely different embodiments of the present invention can be made without departing from the spirit and scope thereof, it is to be understood that the invention is not limited to the specific embodiments thereof except as defined in the appended claims.

According to the invention, since the system has been constructed as mentioned above, after the security to the jobs which need the security is assured, the distribution of the jobs can be controlled.

This application claims priority from Japanese Patent Application No. 2005-039720 filed on Feb. 16, 2005, which is hereby incorporated by reference herein.

What is claimed is:

1. A job allocation control apparatus for controlling allocation of jobs, comprising:

a secure device whose security is assured; and a separate normal device whose security is not assured a security discrimination unit adapted to discriminate whether or not a job has security setting;

a device determination unit adapted to set the job to a scheduling target to the secure device if it is discriminated by said security discrimination unit that the job has the security setting and set the job to a scheduling target to the normal device if it is discriminated by said security discrimination unit that the job does not have the security setting;

a job specifying unit adapted to, when a fault occurs in the secure device, specify a job that cannot be executed by a job deadline due to the fault from among jobs set to the scheduling target to the secure device by said device determination unit;

a determination unit adapted to determine who is operating the normal device and;

a transmission control unit adapted to transmit the job specified by said job specifying unit to normal device if it is determined by said determination unit that an operator of the secure device is operating the normal device and suspend transmission of the specified job if it is determined by said determination unit that an operator of the normal device is operating the normal device.

2. An apparatus according to claim 1, wherein if it is discriminated by said security discrimination unit that the job does not have the security setting, said device determination unit sets the job to the scheduling target to either the secure device or the normal device on the basis of a predetermined attribute of the job so that a balance between an amount of jobs which are distributed to the secure device and an amount of jobs which are distributed to the normal device is kept.

3. An apparatus according to claim 2, wherein the predetermined attribute of the job is a job deadline.

4. An apparatus according to claim 3, further comprising:

a rescheduling unit adapted to set the job having the security setting to the scheduling target to the normal device when a process of the job having the security setting which has been determined to be the scheduling target to the secure device by said device determination unit cannot be executed; and a device searching unit adapted to search for a device which cannot assure the job deadline from the devices as scheduling targets to the secure device, wherein if the device which cannot assure the job deadline is searched for by said device searching unit, said rescheduling unit sets the job having the maximum job amount among the jobs having no security setting serving as scheduling targets to the secure device to the scheduling target to the normal device.

5. A job allocation control method of controlling allocation of jobs comprising:

a secure device whose security is assured; and a separate normal device whose security is not assured a security discrimination step of discriminating whether or not the job has security setting;

a device determination step of setting the job to a scheduling target to the clean device if it is discriminated in said security discrimination step that the job has the security setting and setting the job to a scheduling target to the normal device if it is discriminated in said security discrimination step that the job does not have the security setting;

a job specifying step adapted to, when a fault occurs in the secure device, specify a job that cannot be executed by a job deadline due to the fault from among jobs set to the scheduling target to the secure device by said device determination step;

a determination step adapted to determine who is operating the normal device;

a transmission control step of transmitting the job specified by said job specifying step to the normal device if it is determined by said determination step that an operator of the secure device is operating the normal device and suspend transmission of the specified job if it is determined by said determination step that an operator of the normal device is operating the normal device.

6. A method according to claim 5, wherein in said device decision step, if it is discriminated in said security discrimination step that the job does not have the security setting, the job is set to the scheduling target to either the secure device or the normal device on the basis of a predetermined attribute of the job so that a balance between an amount of jobs which are distributed to the secure device and an amount of jobs which are distributed to the normal device is kept.

7. A method according to claim 6, wherein the predetermined attribute of the job is a job deadline.

8. A method according to claim 7, further comprising:

a rescheduling step adapted to set the job having the security setting to the scheduling target to the normal device when a process of the job having the security setting which has been determined to be the scheduling target to the secure device in said device determination step cannot be executed; and a device searching step of searching for a device which cannot assure the job deadline from the devices as scheduling targets to the secure device, wherein in said rescheduling step, if the device which cannot assure the job deadline is searched for in said device searching step, the job having the maximum job amount among the jobs having no security setting serving as scheduling targets to the secure device is set to the scheduling target to the normal device.

* * * * *